Patented Nov. 7, 1933

1,934,034

UNITED STATES PATENT OFFICE

1,934,034

WRINKLE FINISH VARNISH

Glen Harvey Burgman, Chicago, Ill., assignor to G. J. Liebich Co., Chicago, Ill., a corporation of Illinois No Drawing. Application June 3, 1929
Serial No. 368,191

4 Claims. (Cl. 134—26)

My invention relates to varnishes and particularly to a novel wrinkle finish varnish having novel characteristics.

I am aware that products of this type are known, the base of the products including China-wood oil and rosin. I have found however, that by changing the proportions of the ingredients and the temperature under which they are treated, I am able to secure a greatly superior product at a reduced cost.

My invention contemplates primarily the production of a base for use in preparing wrinkle finish varnish, and secondarily a varnish of that character in its completed form; it also includes the process by which the varnish is prepared.

According to my experience, it is quite essential to keep the amount of rosin and China-wood oil very low especially during the process of polymerization. Even in the finished varnish, the total amount of solids should not exceed 15%.

The process of my invention consists in heating raw China-wood oil with a quantity of hard fusible rosin, the weight of the rosin, to be between 5 and 10% of the weight of the oil, the heating time to be somewhere between 2 and 8 hours, and the temperature to be between 350 and 550 degrees Fah. A product made to these specifications constitutes the base of my wrinkle finish varnish.

A product prepared in this manner, when used by itself, or when mixed with other materials to make a finished varnish, will, when applied and baked, form a wrinkle finish varnish that will surpass any such product known to the market today.

To illustrate my invention, I prepare a certain quantity of the varnish described previously, and chill it with substantially its weight equivalent of high flash naphtha. This resulting product forms the base of my invention, and which may be mixed with another varnish or other varnish materials in order to make a desired finished product.

For instance, in order to prepare one of the particularly desired varnishes I have in mind I use approximately 40 gallons of the described base, to which I add 5 pounds of pigment, 3 gallons of japan dryer, 6 gallons of cumar varnish, the whole of which is thinned with 10 gallons of benzol. The cumar varnish is used as a hardener, the japan for oxidation hardening, and the benzol for its volatile properties. It is to be understood that I am not limiting myself to the type of varnishes, solvents or diluents used, for those skilled in the art know that these can be varied within reasonable limits and still lie within the scope of my invention, and the same variance of proportions also holds true, so long as the basic principle remains the same.

I claim:

1. A composition of matter adapted for use as a base for a wrinkle finish varnish, comprising raw China-wood oil and a hard fusible rosin in proportion of not less than 5% and not more than 10% of the weight of the oil, the compound having been subjected to heat of 350 to 550 degrees Fahrenheit for a period of four to eight hours.

2. A composition of matter adapted for use as a base for a wrinkle finish varnish, comprising raw China-wood oil and a hard fusible rosin in proportion of not less than 5% and not more than 10% of the weight of the oil, the compound having been subjected to heat of 350-550 degrees Fahrenheit for a period of four to eight hours, and a pigment.

3. A composition of matter adapted for use as a base for a wrinkle finish varnish, comprising raw China-wood oil and a hard fusible rosin in proportion of not less than 5% and not more than 10% of the weight of the oil, the compound having been subjected to heat of 350-550 degrees Fahrenheit for a period of four to eight hours, a pigment and a thinner.

4. A wrinkle finish varnish, comprising raw China-wood oil and a hard fusible rosin in proportion of not less than 5% and not more than 10% of the weight of the oil, the compound having been subjected to heat of 350-550 degrees Fahrenheit for a period of four to eight hours, japan dryer, and a volatile solvent.

GLEN HARVEY BURGMAN.